United States Patent [19]

Johnson, Jr. et al.

[11] 4,357,251

[45] Nov. 2, 1982

[54] METHOD OF CERAMIC PREPARATION

[75] Inventors: David W. Johnson, Jr., Pluckemin; Man F. Yan, Summit, both of N.J.

[73] Assignee: Bell Telephone Laboratories, Incorporated, Murray Hill, N.J.

[21] Appl. No.: 849,101

[22] Filed: Nov. 7, 1977

[51] Int. Cl.³ .................... C04B 35/30; C04B 35/38; C04B 35/40; C04B 35/64

[52] U.S. Cl. .................. 252/62.57; 252/62.56; 252/62.59; 252/62.62; 252/62.63; 501/1

[58] Field of Search .............. 252/62.62, 62.57, 62.56, 252/62.59, 62.63; 106/39.5; 501/1

[56] References Cited

U.S. PATENT DOCUMENTS

| | | | |
|---|---|---|---|
| 2,764,552 | 9/1956 | Buckley et al. | 252/62.5 |
| 3,492,236 | 1/1970 | Ross | 252/62.62 |
| 3,532,630 | 10/1970 | Tenzer | 252/62.62 |
| 3,567,641 | 2/1971 | Ross et al. | 252/62.62 |
| 3,655,841 | 4/1972 | Akashi et al. | 252/62.62 |
| 3,674,694 | 4/1972 | Stadler et al. | 252/62.62 |
| 3,769,219 | 10/1973 | Sugano et al. | 252/62.62 |

*Primary Examiner*—Mark Bell
*Attorney, Agent, or Firm*—Richard D. Laumann

[57] ABSTRACT

Preparation of ceramic materials, including ferrites and garnets, through a processing sequence that includes a sintering step is facilitated by a flux, having a relatively low melting temperature and an approximately eutectic composition consisting of two or more of the final ceramic components. The flux permits the sintering step to proceed at temperatures lower than otherwise possible, and results in better control of the final ceramic composition and microstructure.

15 Claims, No Drawings

METHOD OF CERAMIC PREPARATION

BACKGROUND OF THE INVENTION

1. Field of the Invention

This invention relates generally to ceramics and particularly to a method of preparing ceramics that uses a self generated low melting flux.

2. Description of the Prior Art

Ceramic materials play an important role in modern technology. Taking ferrite materials as an example, they are used in such diverse applications as inductor cores for filters, high frequency transformer cores, magnetic memory cores, magnetic recording tapes, magnetic recording heads, and magnets.

The intended use of the ferrite dictates the ferrite microstructure and compositional properties needed to obtain the desired magnetic and mechanical properties. High density ferrites are often desired because the high density reduces the number of defects, such as voids or pores, which degrade magnetic properties such as permeability and mechanical properties such as strength. Large grain size is required for some applications, such as high permeability cores, where the large pore free grains maximize permeability. For other applications, such as low loss inductors, both high density and small grain size are desired to minimize losses.

Considerable effort has been expended in developing techniques to prepare ferrite materials with the desired composition and microstructure. A commonly used method involves solid state reactions, at high temperatures, between the oxides or carbonates of the ferrit cations. The method begins with very fine particles of, for example, oxides or carbonates and then thoroughly mixes them. The mixture is then calcined, milled, granulated, pressed, and sintered. While this method is perfectly adequate for many purposes, the high temperatures required for the sintering step are undesirable as relatively volatile material may be lost from the ceramic composition and consequently compositional uniformity within the ceramic part is difficult to control. Additionally, since lower sintering temperatures inevitably translate into lower production costs, other factors such as sintering time being constant, the high temperatures are an economical liability.

It is well known that the presence of a suitable flux may aid a sintering process, and permit it to proceed at temperatures lower than otherwise possible, by providing a medium or mechanism through which the materials react and diffuse more rapidly. The flux may be in the liquid phase but temperatures below the melting temperature of the flux are also useful. The solid state sintering rate increases with the homologous temperature, $T/T_m$, where T is the absolute temperature and $T_m$ the melting temperature of the flux.

With ferrites, for example, fused salts have been used to provide such a flux. *Ferrites. Proceedings of the International Conference* Kyoto 1970 pp. 105–107. This approach has drawbacks. Provision must be made in the processing sequence for removal of the salts and the ferrite has relatively low solubility in the flux thus limiting the attainable grain size. The flux system $BaO$-$Bi_2O_3$-$B_2O_3$ has been used to prepare nickel ferrite crystals. *Ferrites. Proceedings of the International Conference* Kyoto 1970 pp. 303–305. This approach has the drawback of putting undesired impurities, which can adversely alter the magnetic properties, into the ferrite composition.

The use of a low melting flux, formed from components of the desired final composition, would avoid the described drawbacks. Such fluxes have apparently been used in the preparation of metallic alloys, e.g., $Co_5Sm$, *Journal of Applied Physics* 41 pp. 5247–5249, December 1970. While it has been realized that low melting eutectics might be present in ceramics, e.g., lithia stabilized $\beta''$-$Al_2O_3$ *Ceramic Bulletin* 56 pp. 206–212, 1977, it has not been realized that such low melting fluxes could be prepared and used in the preparation of ceramic materials such as ferrites and garnets.

SUMMARY OF THE INVENTION

It has been found that preparation of a ceramic material of final specified composition and containing at least two cations can be facilitated with a flux formed from a composition of particles containing at least two cations of the desired ceramic composition, with the relative amount of the cations in the flux differing from the relative amount of the cations in the final composition, and having a relatively low melting temperature. The word flux, or first particle composition, means a composition that is a low melting reactive sintering aid present in either or both the solid or liquid phases. Low melting means a melting temperature lower than that of the final composition. The flux is formed by reacting compounds containing two or more of the cations of the final ceramic composition which contains at least two cations. The composition of the flux is desirably at the eutectic point to permit sintering at the lowest temperatures but small deviations from the eutectic composition are contemplated and have only minor effects.

The flux, a physically discrete composition, is added to the ceramic material, present in particle form, that will form the remainder of the final ceramic composition, i.e., a second particle composition. The first and second particle compositions are mixed and sintered. The sintering step, because of the flux, proceeds at a temperature lower than previously possible to obtain equivalent microstructure and compositional properties. The flux, by dissolving the ceramic material or permitting rapid solid state diffusion, facilitates formation of large grains. Although the initial composition is inhomogeneous because of the presence of the flux as a physically discrete composition, the final chemical composition is homogeneous. The final result is a multicomponent ceramic material of a specified composition.

One embodiment is the preparation of MnZn ferrite having small amounts of titania added to control the temperature coefficient of permeability. Self generated fluxes, i.e., first particle compositions, are formed from the $TiO_2$-$MnO$ system with the two components being present at or near their respective weight percents at either of the two eutectic points of the system.

Useful amounts of the flux are above 0.2 percent by weight of the total ceramic composition. Sintering temperatures as much as 200 degrees lower than previously used may be used to produce equivalent microstructures with a normal sintering atmosphere.

DETAILED DESCRIPTION

The flux or first particle composition is formed from particles of a composition having at least two components and containing at least two cations desirably present in the ceramic after processing is completed, i.e., the flux is composed of materials which are not considered as impurities in the final ceramic composition and has a melting temperature lower than that of the final ceramic composition. The amount of flux present should be at least 0.2 percent, by weight, of the total ceramic composition. Although the flux composition will normally be a eutectic composition formed from two or more components or compounds, deviations from the eutectic composition are also contemplated. Such deviations will lead either to the necessity of having larger amounts of flux or to higher processing temperatures. The deviations may be made provided that at least the same weight percent of each material present at the eutectic composition is present in the flux composition used. However, deviations from the eutectic composition result in less efficient sintering, i.e., slower sintering kinetics, because the flux is diluted by nonreactive components and it is difficult to achieve the desired chemical homogeneity within the ceramic material of final specified composition.

The temperature and amount of the flux present control the microstructure produced. Microstructure as used here means composition and distribution of porosity, grain size and phases. Deviations from the eutectic composition will lead to smaller grains and lower density than would be formed at the eutectic composition. Higher processing temperatures will generally cause faster densification and lead to larger grain sizes. Since the amount of flux present determines, at least in part, the microstructure; the desired microstructure will also have to be considered in determining the amount of flux used.

Powders of the materials, for example, oxides or carbonates of the cations, from which the flux will be formed are prepared in appropriate amounts and thoroughly mixed by conventional and well known techniques, and then reacted or calcined by placing in a furnace to yield the desired flux composition. The size of the particles forming the flux composition is desiredly less than 2 microns.

The materials forming the remainder of the ceramic composition, i.e., a second particle composition, are prepared separately, for example, by conventionally weighing, mixing and calcining except that the composition of the material must take into account the flux materials that will eventually form part of the final specified ceramic composition. The second particle composition contains one or more cations present in the final ceramic composition. The final composition contains two or more cations and the cations present in the flux will be present in the final composition in relative amounts differing from those in the flux and the first and second particle composition thus have different compositions.

The flux and second particle composition are now combined and thoroughly mixed. The useful minimum weight percent, with respect to the total ceramic material, of the flux is approximately 0.2 percent. Below 0.2 percent, it is difficult to have sufficient flux to allow adequate mixing or the flux and second composition and produce a useful lowering of the sintering temperature. The maximum weight percent usefully added is determined by the amount of low melting components present in the final ceramic composition. That is, since one of the flux cations will be present in a lesser amount in the final composition, that amount constitutes an upper limit on the useful amount of flux that may be used, i.e., the upper limit occurs when all of one cation is added to the final composition through the flux.

The mixture may now be processed, for example, by ball milling, granulating and pressing in conventional and well known manner.

The sintering step which follows proceeds at a temperature lower than would have been used to obtain the same microstructure if all the materials had been mixed together initially and may be carried out at temperatures lower than the eutectic temperature of the flux composition. Sintering times, in this case, are comparable to those conventionally used. It is not known with certainty why temperatures below the eutectic temperature may be used but it is hypothesized to result from more rapid solid state diffusion caused by the flux. Alternatively, prior art sintering temperatures could be used for shorter times thus effecting a processing economy. Additionally, the combination of shorter times and somewhat lower temperatures constitutes a processing economy.

It is believed that in the initial stages of sintering, the second particle composition, dissolves in the flux or first particle composition to both hasten the sintering process and if desired, promote the growth of large grains. Although the first particle composition is initially present in discrete particle form within the mixture of first and second particle compositions, at the end of the sintering process the cations present in the flux uniformly distributed throughout final ceramic composition. The sintering proceeds in a conventional atmosphere. For example, ferrites may be sintered in an atmosphere 1 percent to 100 percent oxygen with the remaining atmosphere being an inert gas such as nitrogen and garnets may be sintered in air.

The invention is especially well suited for ferrites and garnets. In the examples that follow the statement that useful fluxes are formed within a system means that the first particle composition is selected from that system and that each component of the system is present in its approximate weight percent at the eutectic composition although deviations from the eutectic composition are contemplated. The terms MnZn and NiZn ferrites refer to the families of ferrites whose primary cations in addition to the iron cation, are MnZn and NiZn cations, respectively.

Titanium cations are often added to MnZn ferrites in amounts generally less than 10 weight percent of the total ferrite to control the temperature coefficient of permeability. Useful fluxes are formed in the $TiO_2$-$MnO$ system. The eutectic compositions are 64.0 weight percent $TiO_2$-36 weight percent MnO and 34.0 weight percent $TiO_2$-66.0 weight percent MnO and have eutectic temperatures of 1290 and 1330 degrees C., respectively. Sintering temperatures as low as 1000 degrees C. may be used and typical sintering temperatures will be between 1100 and 1300 degrees C.

Other useful fluxes for the same ferrites may be formed from the $TiO_2$-FeO system. The eutectic compositions are 5 weight percent $TiO_2$-95 weight percent FeO, 42 weight percent $TiO_2$-58 weight percent FeO and 68 weight percent $TiO_2$-32 weight percent FeO and have eutectic temperatures of 1305, 1320 and 1330 degrees C., respectively. Sintering temperatures as low as 1000 degrees C. may be used and typical sintering temperatures will be between 1100 and 1300 degrees C. Other useful fluxes for MnZn ferrites are formed from the FeO-MnO-$TiO_2$ system, which has a eutectic composition at 72 weight percent FeO 6.5 weight percent $TiO_2$-21.5 weight percent MnO and a eutectic temperature of 1300 degrees C. Typical sintering temperatures will be between 1100 and 1300 degrees C. and temperatures as low as 1000 degrees C. may be used.

Calcium cations are often added to NiZn and MnZn ferrites to reduce losses. Useful fluxes are formed from the CaO-Fe$_2$O$_3$ system which has a eutectic composition at 22 weight percent CaO-78 weight percent Fe$_2$O$_3$ and a eutectic temperature of 1205 degrees C. Sintering temperatures as low as 950 degrees C. may be used and typical sintering temperatures will be between 1100 and 1300 degrees C.

Silicon cations are often added to NiZn and MnZn ferrites for reasons similar to those for calcium. Useful fluxes are formed from both the FeO-SiO$_2$ system which has a eutectic composition at 78 weight percent FeO-22 weight percent SiO$_2$ and a eutectic temperature of 1185 degrees C. and the MnO-SiO$_2$ system which has a eutectic composition at 62 weight percent MnO-38 weight percent SiO$_2$ and a eutectic temperature of 1251 degrees C. Sintering temperatures as low as 950 and 1000 degrees C., for the first and second systems, respectively, many be used and typical sintering temperatures will be between 1000 and 1300 degrees C.

Chromium cations are sometimes added to MnZn ferrites. Useful fluxes are formed from the Cr$_2$O$_3$-FeO system which has a eutectic composition at 2.5 weight percent Cr$_2$O$_3$-97.5 weight percent FeO and a eutectic temperature of 1345 degrees C. Sintering temperature as low as 1050 degrees C. may be used and typical sintering temperatures will be between 1150 and 1350 degrees C.

Fabrication of other materials, such as garnets, is facilitated by the invention. For example, yttrium iron garnet, with or without gadolinium, may be fabricated using a flux formed from the Y$_2$O$_3$-Fe$_2$O$_3$ system which has a eutectic composition at 15.4 weight percent Y$_2$O$_3$-84.6 weight percent Fe$_2$O$_3$ and a eutectic temperature of 1440 degrees C. Sintering temperatures between 1250 and 1450 degrees C. may be used.

EXAMPLE 1

Finely powdered TiO$_2$, 133.33 gms, and MnCO$_3$, 108.03 gms, were used to form the flux, i.e., the first particle composition, for fabricating a high density, large grain MnZn ferrite. The powders were thoroughly mixed in a stainless steel blender for 40 minutes. After filtering, drying and screening through a 20 mesh sieve, the powder was placed in an alumina boat and calcined at 1010 degrees C. for 21 hours in a nitrogen atmosphere having less than 1 percent oxygen.

MnZn ferrite powder with a composition of Mn$_{0.51}$Zn$_{0.43}$Fe$_{2.06}$O$_4$ was prepared by mixing and calcining Fe$_2$O$_3$, MnCO$_3$ and ZnO at 900 degrees C. for 30 minutes in air.

The ferrite powder, i.e., the second particle composition, 142.50 gms, and 5 weight percent, with respect to the total ferrite weight, of the low melting composition, i.e., the first particle composition, 7.50 gms, were mixed with an organic binder and ball milled for 16 hours. The material was pressed through a 20 mesh sieve and samples were pressed at 36500 psi and heat treated at 600 degrees C. to remove the organic binder. The samples were sintered in oxygen at a heating rate of 200 degrees C./hour up to 1300 degrees C. and then held at this temperature for 8 hours. The samples were cooled to 1150 degrees C. in nitrogen at a cooling rate of 400 degrees C./hour and annealed at 1150 degrees C. for 10 hours in nitrogen.

The ferrite had a grain size of approximately 35 μm and a porosity less than 0.5 percent.

EXAMPLE 2

A low melting composition was prepared as in Example 1 using 66.67 gms of TiO$_2$ and 216.05 gms of MnCO$_3$ and 10 weight percent of it, 15 gms, was added to MnZn ferrite powder, 135 gms, prepared as in Example 1. A high density, small grain ferrite was formed by using a lower sintering temperature.

The mixture was sintered at 1150 degrees C. for 45 hours in an oxygen atmosphere and then annealed in nitrogen at 1100 degrees C. for 12 hours. Processing steps, except for the times and temperatures, are identical to those in Example 1.

The ferrite had a grain size of approximately 6 μm and a porosity less than 0.5 percent.

EXAMPLE 3

Fe$_2$O$_3$ and CaCO$_3$ reagent grade powders were dried at 380 degrees for 16 hours in air. 98.16 gms of CaCO$_3$ and 195 gms of Fe$_2$O$_3$ were mixed for 30 minutes in alcohol. After filtering, drying and screening through a 20 mesh stainless steel sieve, the powder was placed in a platinum crucible and fired in air for 16 hours at 1160 degrees C. to form the first particle composition or flux. MnZn ferrite was prepared as in Example 1. 2.0 gms of the Fe$_2$O$_3$-CaO mixture was mixed with 218.0 gms of the MnZn ferrite and processed as in Example 1.

What is claimed is:

1. A method of producing a ceramic material of final specified composition having desired characteristics, said material having at least two cations, comprising:
   mixing a first particle composition and a second particle composition, said first and said second particle compositions having different compositions, said first and said second particle compositions forming said final specified composition, and
   sintering said first and said second particle composition characterized in that said first particle composition forms at least 0.2 weight percent of said final specified composition and has an approximately eutectic composition and has at least two cations of said final composition in relative amounts differing from the relative amounts of said cations in said final specified composition in which the melting temperature of said first particle composition is lower than the melting temperature of said final specified composition, and in which said second particle composition contains at least one cation of said final specified composition whereby said final specified composition is produced under expedited sintering conditions without deviation from said desired characteristics of said final composition.

2. A method as recited in claim 1 in which said final specified composition is a MnZn ferrite.

3. A method as recited in claim 2 in which said first particle composition is selected from the group consisting of TiO$_2$-MnO; TiO$_2$-FeO; FeO-TiO$_2$-MnO; CaO-Fe$_2$O$_3$; FeO-SiO$_2$; MnO-SiO$_2$; and Cr$_2$O$_3$-FeO.

4. A method as recited in claim 3 in which said first particle composition is TiO$_2$-MnO and said sintering step proceeds at a temperature between 1100 and 1300 degrees C.

5. A method as recited in claim 3 in which said first particle composition is TiO$_2$-FeO and said sintering step proceeds at a temperature between 1100 and 1300 degrees C.

6. A method as recited in claim 3 in which said first particle composition is FeO-TiO$_2$-MnO and said sintering step proceeds and a temperature between 1100 and 1300 degrees C.

7. A method as recited in claim 3 in which said first particle composition is CaO-Fe$_2$O$_3$ and said sintering step proceeds at a temperature between 1100 and 1300 degrees C.

8. A method as recited in claim 3 in which said first particle composition is Cr$_2$O$_3$-FeO and said sintering step proceeds at a temperature between 1150 and 1350 degrees C.

9. A method as recited in claim 1 in which said final specified composition is a NiZn ferrite.

10. A method as recited in claim 9 in which said first particle composition is selected from the group consisting of CaO-Fe$_2$O$_3$; FeO-SiO$_2$; and MnO-SiO$_2$.

11. A method as recited in claim 10 in which said first particle composition is CaO-Fe$_2$O$_3$ and said sintering step proceeds at a temperature between 1100 and 1300 degrees C.

12. A method as recited in claim 1 in which said final specified composition is a garnet.

13. A method as recited in claim 12 in which said garnet is yttrium iron garnet.

14. A method as recited in claim 13 in which said first particle composition is Y$_2$O$_3$-Fe$_2$O$_3$.

15. A method as recited in claim 14 in which said sintering step proceeds at temperatures between 1250 and 1450 degrees C.

* * * * *